UNITED STATES PATENT OFFICE 2,546,652

PYRIDINDENES AND PROCESS FOR THEIR MANUFACTURE

John Thomas Plati, Passaic, and Wilhelm Wenner, Montclair, N. J., assignors to Hoffmann-La Roche Inc., Nutley, N. J., a corporation of New Jersey No Drawing. Application July 30, 1949, Serial No. 107,833

12 Claims. (Cl. 260—297)

The present invention relates to a new method for producing 2-lower alkyl-9-R-tetrahydro-1-pyridindenes and the acid addition salts thereof, R being a radical of the benzene and pyridine series. The compounds are useful as spasmolytics.

The invention also relates to new intermediates which are employed in the synthesis and to their method of production. The intermediates can be represented by the following formula:

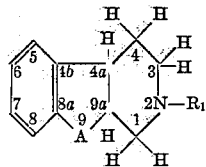

wherein A stands for CO and C(OH)R, R having the significance already assigned thereto, and $R_1$ stands for lower alkyl. Thus, when A is CO and $R_1$ is methyl, the compound is 2-methyl-9-keto-2,3,4,4a,9,9a-hexahydro-1-pyridindene. When $R_1$ is methyl and A is C(OH)R, R being phenyl, the compound is 2-methyl-9-hydroxy-9-phenyl-2,3,4,4a,9,9a-hexahydro-1-pyridindene, and when $R_1$ is methyl and A is C(OH)R, R being $\alpha$-pyridyl, the compound is 2-methyl-9-hydroxy-9($\alpha$-pyridyl)-2,3,4,4a,9,9a-hexahydro-1-pyridindene.

The new method for producing the 2-lower alkyl-9-R-tetrahydro-1-pyridindenes comprises reacting a 1-lower alkyl-3-carbalkoxy-1,2,5,6-tetrahydropyridine (I) with a phenyl magnesium halide to produce a 1-lower alkyl-4-phenyl-piperidine-3-carboxylic acid ester (II), hydrolyzing (II) to the corresponding 1-lower alkyl-4-phenyl-piperidine-3-carboxylic acid (III), converting (III) into the corresponding 1-lower alkyl-4-phenyl-piperidine-3-carboxyl halide (IV), cyclizing (IV) with a reagent of the Friedel-Crafts type to form a 2-lower alkyl-9-keto-2,3,4,4a,9,9a-hexahydro-1-pyridindene (V), reacting (V) with a LiR compound where R stands for a radical of the benzene or pyridine series to produce a 2-lower alkyl-9-hydroxy-9R-2,3,4,4a,9,9a-hexahydro-1-pyridindene (VI), and dehydrating (VI) to form a 2-lower alkyl-tetrahydro-9-R-1-pyridindene (VII), either by removing directly one molecule of water from (VI), or by first replacing the OH in (VI) with a halogen radical to form a 2-lower alkyl-9-halogen-9-R-2,3,4,4a,9,9a-hexahydro-1-pyridindene (VIII), and dehydrohalogenating (VIII) to form the 2-lower alkyl-9-R-tetrahydro-1-pyridindene (VII).

The reactions described in the preceding paragraph can be represented in terms of the following formulae, wherein the roman numerals and the symbols R and $R_1$ are used in the same sense as in the preceding description; "alk" and "X" being used to represent a typical alkyl esterifying radical and a halogen respectively:

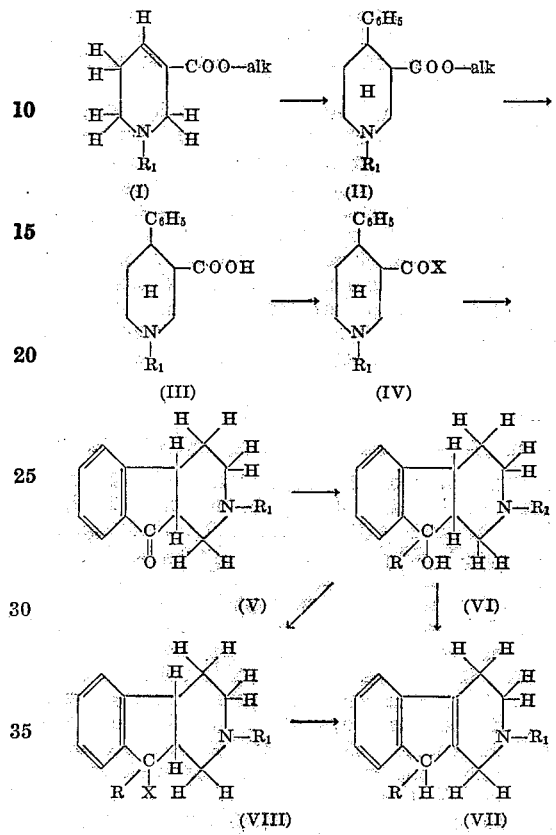

Two stereoisomers of compound (II), hereinafter referred to as the $\alpha$-isomer and the $\beta$-isomer, are possible of formation in reacting (I) with the phenyl magnesium halide. Thus, when 1-methyl-3-carbomethoxy-1,2,5,6-tetrahydropyridine was reacted with phenyl magnesium bromide, two isomers of 1-methyl-3-carbomethoxy-4-phenyl-piperidine were isolated. The stereoisomers may be separated from each other, as by fractional crystallization. Their separation, however, is not necessary with respect to the following steps in the process, since the subsequent reactions may be carried out readily with the mixture of the two isomers, in view of the fact that either isomer or the mixture thereof is converted into the identical compound (V).

The mixture or the isolated isomers of (II) can be hydrolyzed by means of any suitable hydrolyzing agent as, for example, hydrochloric acid, sulfuric acid, or phosphoric acid. The hydrolysis leads to the formation of the acid (III) in the form of separate α- and β-isomeric acids when employing either the α- or β-isomer of (II) or to the formation of a mixture of the two isomeric acids when a mixture of the stereoisomeric esters is hydrolyzed.

Any suitable halogenating agent as, for example, thionyl chloride, may be employed to convert the acid (III) into the corresponding carboxyl halide (IV). A mixture of two stereoisomeric isomers of the halide (IV) is obtained when a mixture of the α- and β-acids (III) is halogenated. When halogenating the α- or β-acids separately, the corresponding α- or β-carboxyl halides (IV) are obtained.

To cyclize the carboxyl halide (IV), a cyclizing agent of the Friedel-Crafts type is employed, such as aluminum chloride and the like, preferably in the presence of an inert solvent. The identical compound, namely, 2-alkyl-9-keto-2,3,4,4a,9,9a-hexahydro-1-pyridindene is obtained when either the α- or β-isomer of the carboxyl halide (IV) or the mixture of the stereoisomers thereof is cyclized.

The 2-lower alkyl-9-hydroxy-9-R-2,3,4,4a,9,9a-hexahydro-1-pyridindene (VI) can be dehydrated in any suitable manner. In a preferred mode of dehydration, the compound is first halogenated by means of a halogenating agent, such as thionyl chloride, and the halogenide (VIII) thus obtained is then dehydrohalogenated with an alkaline agent as, for example, ammonium hydroxide, sodium hydroxide, potassium hydroxide, sodium carbonate or potassium carbonate to form (VII).

The following examples will serve to illustrate the invention:

EXAMPLE 1

*1-methyl-3-carbomethoxy-4-phenyl-piperidine*

To a mixture of 38 grams of arecoline hydrobromide (1-methyl-3-carbomethoxy-1,2,5,6-tetrahydropyridine hydrobromide) and 30 cc. of water were added with cooling 25 cc. of a 50 percent (by weight) solution of potassium carbonate in water. The mixture was extracted five times with 100 cc. portions of benzene. At the end of the second and third extractions, an additional 25 cc. of the potassium carbonate solution were added. The combined benzene extracts were dried with sodium sulfate, and the benzene removed in vacuo. The arecoline base obtained weighed 25 grams, and was dissolved in ether sufficient to make 65 cc. of solution.

In a 500 cc. three-necked flask were placed 7.94 grams of magnesium turnings and about 100 cc. of dry ether. A solution of 50.5 grams of brombenzene in 100 cc. of ether was added in the course of an hour to maintain gentle reflux. After stirring for 30 minutes the mixture was cooled to −10° C. and the ether solution of the arecoline base was added during the course of one hour. The mixture was stirred for 20 minutes longer at the same temperature, poured into cracked ice, and then treated slowly with 160 cc. of ice cold 6 N hydrochloric acid. The aqueous layer was separated, extracted with 200 cc. of ether, and then treated with cooling in an ice bath with 200 cc. of 50 percent potassium carbonate solution.

The mixture was extracted with 400 cc. of ether, and the ether layer was separated by centrifuging. The aqueous layer containing insoluble magnesium hydroxide was extracted first with 350 cc. and then with 250 cc. of ether. The combined ether extracts were dried with sodium sulfate, and after removing the ether, the residue was distilled. An oil boiling at 124–128° C. at 0.5 mm. was obtained. This oil was a mixture of the two stereoisomeric forms of 1-methyl-3-carbomethoxy-4-phenyl-piperidine.

EXAMPLE 2

*1-methyl-3-carbomethoxy-4-phenyl-piperidine hydrobromide (α-isomer)*

The ester mixture obtained in Example 1 was dissolved in about one liter of ether, and hydrogen bromide gas was introduced. The precipitate was crystallized from 150 cc. of methanol and yielded crystals, M. P. 204–207° C. The melting point was raised to 214–217° C. by recrystallization from ethyl alcohol. This compound is the hydrobromide of one of the stereoisomeric forms of 1-methyl-3-carbomethoxy-4-phenyl-piperidine which will be referred to hereinafter as the α-isomer.

To form the free α-base, there was added to a mixture of the above α-hydrobromide and 50 cc. of water with cooling 8 cc. of 50 percent potassium carbonate solution. The mixture was extracted twice with 25 cc. of ether, and the ether solution dried with sodium sulfate. Upon distillation there was obtained the free base, B. P. 100° C. at 0.2 mm.; $n_D^{24.5}$=1.5188.

EXAMPLE 3

*Hydrolysis to 1-methyl-3-carboxy-4-phenyl-piperidine hydrochloride (α-isomer)*

To the α-isomer of 1-methyl-3-carbomethoxy-4-phenyl-piperidine obtained according to the preceding example were added 11 cc. of water and 15 cc. of concentrated (35%) hydrochloric acid, and the mixture was distilled slowly in 25 minutes until no more methanol distilled over. The reaction mixture was then distilled to dryness in vacuo in a bath which was gradually brought to 85° C. and the residue was crystallized from 15 cc. of ethanol. In this manner 1-methyl-3-carboxy-4-phenyl-piperidine hydrochloride, M. P. 214–216° C. was obtained.

EXAMPLE 4

*1-methyl-3-carbomethoxy-4-phenyl-piperidine oxalate (β-isomer)*

The methanol filtrate from the crystallization of the crude hydrobromide mixture in Example 2 was distilled to dryness in vacuo. The residue melted at 166–168° C. It was treated while cooling with 90 cc. of 10 percent sodium carbonate and extracted with 150, 100 and 100 cc. portions of ether. The combined ether extracts were treated with a saturated solution of oxalic acid in ether until no further precipitation occurred, and the crude precipitate was crystallized from 150 cc. of ethyl alcohol. In this manner the oxalate of the β-ester, M. P. 157–158° C. was obtained.

To a solution of 18.25 grams of the oxalate of the β-ester in 150 cc. of water were added 50 cc. of 50 percent potassium carbonate solution. The base precipitated as a solid. It was extracted with 100 cc. of ether, and the ether solution was dried with sodium sulfate and distilled at 100–110° C. and 0.25 mm. The β-isomer of 1-methyl-3-carbomethoxy-4-phenyl-piperidine thus obtained, melted at 55–58° C.

EXAMPLE 5

1-methyl-3-carboxy-4-phenyl-piperidine hydrochloride (β-isomer)

A mixture of 12.0 grams of the β-isomer of 1-methyl-3-carbomethoxy-4-phenyl-piperidine, 33 cc. water and 44 cc. of concentrated hydrochloric acid was distilled through a 12 plate column over a period of about 30 minutes until methanol no longer came over. The mixture was distilled to dryness in vacuo in a bath which was gradually brought to 80° C. The residue was crystallized from 40 cc. of hot ethyl alcohol to give plate-like crystals of 1-methyl-3-carboxy-4-phenyl-piperidine hydrochloride melting at 212–213° C. and containing one molecule of alcohol of crystallization.

EXAMPLE 6

2-methyl-9-keto-2,3,4,4a,9,9a-hexahydro-1-pyridindene from the α-isomer of 1-methyl-3-carboxy-4-phenyl-piperidine hydrochloride To 7.25 grams of 1-methyl-3-carboxy-4-phenyl-piperidine hydrochloride (α-isomer) were added 50 cc. of thionyl chloride. Complete solution occurred. After standing at 20–30° C. for two hours, the thionyl chloride was distilled off from the reaction mixture under subatmospheric pressure and below 50° C. To the yellow residue were added 100 cc. of anhydrous tetrachloroethane. After stirring for a short time the yellow residue went into solution and the resulting solution was again subjected to distillation at subatmospheric pressure until 50 cc. of distillate was obtained. To the residual solution were added 50 cc. more of tetrachloroethane. The solution of 1-methyl-4-phenyl-1-piperidine-3-carboxyl chloride thus obtained was warmed to 40° C. with stirring and 9 grams of anhydrous aluminum chloride were added in portions. A vigorous evolution of hydrogen chloride occurred. After complete addition of the anhydrous aluminum chloride the reaction mixture was stirred for one hour at 40° C. The reaction mixture was then poured into 300 grams of ice and 25 cc. of concentrated hydrochloric acid. After standing overnight the organic and aqueous layers were separated. The tetrachloroethane layer was extracted with 20 cc. of water and then discarded. The combined aqueous liquors were extracted once with ether, cooled to 15° C. and made strongly alkaline with 50 percent sodium hydroxide solution. The resulting mixture was then extracted once with 150 cc. of ether and then three times more with 25 cc. portions of ether. The combined ether extracts were dried over sodium sulfate and concentrated on the steam bath. The residue was then distilled at subatmospheric pressure to give 5.1 grams of a material boiling at 120° C. at 0.15 mm. The distillate after standing a short time formed crystals of 2-methyl-9-keto-2,3,4,4a,9,9a-hexahydro-1-pyridindene, M. P. 64.5–65.5° C. One gram of the base was dissolved in 50 cc. of dry ether, and dry hydrogen bromide gas was introduced into the solution. The precipitate was filtered and crystallized from 7 cc. of ethanol. The crystals of 2-methyl-9-keto-2,3,4,4a,9,9a-hexahydro-1-pyridindene hydrobromide thus obtained melted at 208–210° C.

EXAMPLE 7

2-methyl-9-keto-2,3,4,4a,9,9a-hexahydro-1-pyridindene from the β-isomer of 1-methyl-3-carboxy-4-phenyl-piperidine hydrochloride To 40 grams of the β-isomer of 1-methyl-3-carboxy-4-phenyl-piperidine hydrochloride containing alcohol of crystallization were added with cooling and stirring 160 cc. of thionyl chloride. After standing at 20–30° C. for 3.5 hours the thionyl chloride was removed at reduced pressure in a bath which was gradually heated to 60° C. To the residue, 250 cc. of tetrachloroethane were added, and 50 cc. were distilled at reduced pressure in order to remove traces of thionyl chloride. During 45 minutes, 50 grams of aluminum chloride were added at 40° C. in a bath maintained at about 38° C. The mixture was stirred for an additional 30 minutes and poured into 400 grams of ice and 50 cc. of concentrated hydrochloric acid. The aqueous layer was separated, extracted with 100 cc. of ether, and treated with 300 cc. of a 30 percent sodium hydroxide solution while cooling below 15° C. The organic base was extracted with 200 and 100 cc. portions of ether. After drying with sodium sulfate, the ether was removed and the residue distilled. 2-methyl-9-keto-2,3,4,4a,9,9a-hexahydro-1-pyridindene of B. P. 127° C. at 0.3 mm. was obtained.

The hydrobromide of the aforesaid base was prepared by passing hydrogen bromide gas into a solution of one gram of the base in 50 cc. of ether. The precipitate was digested with 20 cc. of hot acetone, cooled, and filtered. Further crystallization from ethyl alcohol gave the hydrobromide, M. P. 208–211° C. It was identical with the hydrobromide formed from the α-series according to Example 6.

A sample of the hydrobromide was dissolved in water and dilute sodium hydroxide was added. The base thus precipitated melted at 64–65° C. It was identical with the base prepared in a similar manner from the hydrobromide of Example 6.

EXAMPLE 8

2-methyl-9-hydroxy-9-phenyl-2,3,4,4a,9,9a-hexahydro-1-pyridindene

In a one-liter 3-necked flask provided with stirrer and condenser were added about 200 cc. of dry ether and 1.17 grams of lithium wire cut in small pieces. During a period of one hour 60 cc. of an ether solution containing 13.1 grams of brombenzene was added to maintain gentle reflux. After stirring for 2 hours more to complete the formation of the lithium phenyl, the mixture was cooled in an ice bath to 3° C. and a solution of 16.7 grams of 2-methyl-9-keto-2,3,4,4a,9,9a-hexahydro-1-pyridindene in about 65 cc. of dry ether was added in 40 minutes at 3–5° C. The mixture was stirred for an additional 22 minutes in the ice bath, and then the ice bath was removed, and stirring continued for 1.5 hours. A white solid was gradually precipitated.

The mixture was again cooled in the ice bath, and 53.4 cc. of 3.18 N sulfuric acid in 150 cc. water were added slowly. In order to neutralize the excess acid, 33.7 cc. of 2.48 N sodium hydroxide was added, and the ether layer was separated. To insure complete separation of the base, the aqueous layer was treated with 40 cc. of a 50 percent potassium carbonate solution and extracted with 100 cc. of ether. The combined ether solutions were dried with sodium sulfate and treated with a saturated ether solution of oxalic acid. The precipitate was crystallized from 100 cc. of methanol to give crystals, melting at 208–210° C. with effervescence. The compound thus obtained is the oxalate of 2-methyl-9-hydroxy-9-phenyl-2,3,4,4a,9,9a-hexahydro-1-pyridindene.

To form the free base, a hot solution of 8.2 grams of the oxalate in 200 cc. of water was cooled to room temperature and 30 cc. of 10 percent sodium hydroxide solution were added. The gummy precipitate first obtained gradually hardened and it was crushed and filtered. On drying it melted at 90–92° C. A sample was crystallized from dilute alcohol. It melted at 91–93° C.

EXAMPLE 9

*2-methyl-9-phenyl-2,3,4,9-tetrahydro-1-pyridindene*

To one gram of 2-methyl-9-hydroxy-9-phenyl-2,3,4,4a,9,9a-hexahydro-1-pyridindene were added with cooling 10 cc. of thionyl chloride and the mixture was allowed to stand for 1.5 hours. The excess thionyl chloride was removed at subatmospheric pressure below 50° C., and to the residue were added 10 cc. of 10 percent sodium hydroxide solution. After shaking for a few minutes 5 cc. of ethyl alcohol and 5 cc. of concentrated (25%) ammonium hydroxide was added. The blue solid which was obtained on permitting the mixture to stand, was crystallized from dilute acetone to give crystals melting at 82–84° C. A second crystallization gave pure 2-methyl-9-phenyl-2,3,4,9-tetrahydro-1-pyridindene, M. P. 89–90° C.

EXAMPLE 10

*1-ethyl-3-carbethoxy-1,2,5,6-tetrahydropyridine*

A solution of 380 grams of 1-ethyl-3-carbethoxy-4-piperidone hydrochloride in 500 cc. of water was brought to pH 5.80 by treatment with concentrated aqueous sodium hydroxide. The resultant solution was then hydrogenated at 48–50° C. with Raney nickel. The reduction required about 1.5 hours. The catalyst was filtered, and the solution treated below 10° C. with 400 grams of potassium carbonate. The resultant solution was then extracted five times with 400 cc. portions of ether. The ethereal liquors were dried with sodium sulfate and the ether distilled off at atmospheric pressure. The residue was then distilled in vacuo, yielding 1-ethyl-3-carbethoxy-4-hydroxy-piperidine, B. P. 100° C. at 0.2 mm.

A solution of 233 grams of 1-ethyl-3-carbethoxy-4-hydroxy-piperidine, in 756 cc. of acetic anhydride was treated with 6 drops of 95% sulfuric acid, heated on a steam bath for 3 hours and then subjected to distillation at reduced pressure through a 20 plate fractionating column to remove any formed acetic acid and excess acetic anhydride. The residue was then subjected to pyrolytic distillation through a 12 plate fractionating column at 50 mm. and bath temperatures varying from 125 to 155° C. Acetic acid distilled off. When all of the acetic acid had been removed, the residue was distilled under 6 mm. pressure. The fraction boiling at 110–113° C. is 1-ethyl-3-carbethoxy-1,2,5,6-tetrahydropyridine. The compound has a density of $$D_{25}^{25}=1.002$$

and a refractive index of $n_D^{23}=1.4743$.

EXAMPLE 11

*1-ethyl-3-carbethoxy-4-phenyl-piperidine*

A solution of phenyl magnesium bromide in 1000 cc. of anhydrous ether was prepared in the known manner from 50 grams of magnesium and 320 grams of brombenzene. The solution was cooled to −10° C. with a Dry Ice-acetone bath, and at this temperature a solution of 187 grams of 1-ethyl-3-carbethoxy-1,2,5,6-tetrahydropyridine in 356 cc. of anhydrous ether was added dropwise over one hour. The reaction mixture was stirred one hour longer at this temperature. The bath temperature was then lowered to −50° C., and a solution of 164 grams of 50% sulfuric acid by volume in 595 cc. of water was added at such a rate as to keep the reaction mixture below 20° C. The aqueous and organic layers were separated, and the aqueous layer extracted twice with 150 cc. of ether. The ethereal extracts were dried with sodium sulfate and the ether was distilled off at atmospheric pressure.

148 grams of the residue was dissolved in 750 cc. of anhydrous ether, and dry hydrogen bromide was passed into the solution to yield a white granular hydrobromide. After crystallization from ethanol 150 grams of 1-ethyl-3-carbethoxy-4-phenyl-piperidine hydrobromide, M. P. 172–174° C. was obtained. This was dissolved in 250 cc. of water and the free base liberated with potassium carbonate. The oil which separated was extracted three times with 150 cc. portions of ether. The combined ether solutions were dried with sodium sulfate and the ether was distilled off at atmospheric pressure. The residue was distilled, yielding 1-ethyl-3-carbethoxy-4-phenyl-piperidine, B. P. 124–126° C. at 0.25 mm.

EXAMPLE 12

*2-ethyl-9-keto-2,3,4,4a,9,9a-hexahydro-1-pyridindene*

A solution of 25 grams of 1-ethyl-3-carbethoxy-4-phenyl-piperidine in 125 cc. of constant boiling hydrochloric acid was distilled for 40 minutes at atmospheric pressure through a 10 plate fractionating column. During this time the 1-ethyl-3-carbethoxy-4-phenyl-piperidine was saponified to the acid. The solution was then distilled to dryness in vacuo and the residue further dried in a vacuum desiccator. The dried residue was dissolved in 160 cc. of thionyl chloride and allowed to stand 20 hours at 20–30° C. The excess thionyl chloride was then distilled off in vacuo, 150 cc. of anhydrous tetrachloroethane was added and the solution then distilled to dryness in vacuo, yielding 1-ethyl-4-phenyl-piperidine-3-carboxylic acid chloride. This was dissolved in 250 cc. of anhydrous tetrachloroethane and then treated at 40° C. with stirring for 20 minutes with 32 grams of anhydrous aluminum chloride. When about half of the aluminum chloride was added, a vigorous evolution of hydrogen chloride took place. After the addition of aluminum chloride was completed, the reaction mixture was stirred 1.5 hours at 40° C. It was then poured into 300 grams of ice and 100 cc. of concentrated hydrochloric acid. The aqueous and organic layers which formed were separated and the organic layer was extracted twice with 100 cc. portions of 10% hydrochloric acid. The combined aqueous liquors were made alkaline with sodium hydroxide, and were extracted three times with 250 cc. portions of ether. The combined ether extracts were dried with sodium sulfate and the ether evaporated at atmospheric pressure. The residue was distilled, and yielded 2-ethyl-9-keto-2,3,4,4a,9,9a-hexahydro-1-pyridindene, B.P. 128° C. at 0.12 mm. On standing for a short time this base crystallized. Recrystallization from 25 cc. of acetone yielded the pure base, M.P. 89–90° C.

EXAMPLE 13

*2-ethyl-9-hydroxy-9-phenyl-2,3,4,4a,9,9a-hexahydro-1-pyridindene*

A solution of 0.074 mol of phenyl lithium in 230 cc. of ether while being maintained with external cooling at 0–3° C. was treated dropwise within 30 minutes with 16 grams of 2-ethyl-9-keto - 2,3,4,4a,9,9a, - hexahydro - 1 - pyridindene in 200 cc. of ether. After the addition was completed, the cooling bath was removed and the stirring continued for 1.5 hours. The reaction temperature was then lowered below 10° C. and the reaction mixture treated with 72.5 cc. of 1.020 N hydrochloric acid. The aqueous layer was separated and then treated with 50 cc. of 50% potassium carbonate solution and extracted three times with 100 cc. portions of ether. The ethereal extracts were combined, dried with sodium sulfate and evaporated on a steam bath. The residue was then dissolved in 100 cc. of ethanol. The solution was heated to boiling and treated dropwise with water until turbidity resulted. Then 5 cc. more of ethanol was added to clarify the solution. The solution was quickly cooled and scratched. A product first separated as an oil, which with continued cooling and scratching, solidified. The solution was cooled at 4° C. for four hours and filtered. After drying, a white powder, melting at 78–80° C., was obtained. Crystallization from petroleum ether yielded pure 2 - ethyl - 9 - hydroxy - 9 - phenyl-2,3,4,4a,9,9a - hexahydro - 1 - pyridindene, M.P. 78–80° C.

EXAMPLE 14

*2-ethyl-9-hydroxy-9-(o-methoxyphenyl)-2,3,4,4a,9,9a-hexahydro-1-pyridindene*

A solution of 0.074 mol of o-methoxyphenyl lithium in 250 cc. of ether, which was prepared in the known manner from o-bromoanisole and lithium, was maintained at 0–3° C. with external cooling and treated dropwise while stirring within 30 minutes with 16 grams of 2-ethyl-9-keto-2,3,4,4a,9,9a-hexahydro-1-pyrdindene in 200 cc. of ether. After the addition was completed, cooling was discontinued. After further stirring for 1.5 hours, the temperature was then reduced to below 10° C., and while maintaining this temperature the stirred reaction mixture was treated with a solution of 5.02 grams of 97.1% sulfuric acid in 60 cc. of distilled water. Two clear layers resulted. The reaction mixture was then again treated with 5.02 grams of the sulfuric acid solution in 60 cc. of water whereby a white precipitate formed. This precipitate is 2 - ethyl - 9 - hydroxy - 9 - (o - methoxyphenyl)-2,3,4,4a,9,9a - hexahydro - 1 - pyridindene hydrobromide which is formed by double decomposition of the sulfate of the pyridindene base and the lithium bromide present in the o-methoxyphenyl lithium solution. After stirring for two hours at 5° C. and standing for 16 hours at 4° C., the precipitate was filtered, washed with water and dried for 48 hours in vacuo. The compound had a M.P. of 160–163° C. and after two recrystallizations from ethanol the pure hydrobromide of 2 - ethyl - 9 - hydroxy - 9-(o - methoxyphenyl) - 2,3,4,4a,9,9a - hexahydro-1-pyridindene, M.P. 188–189° C. was obtained.

This hydrobromide when dissolved in water and treated with sodium hydroxide yielded the free base which after standing gave a granular product, M.P. 105–106° C.

EXAMPLE 15

*2 - ethyl - 9 - hydroxy-9-(α-pyridyl)-2,3,4,4a,9,9a-hexahydro-1-pyridindene*

A stirred suspension of 2.25 grams of lithium in 30 cc. of ether was heated to boiling and treated dropwise within 40 minutes with a solution of 20.55 grams of anhydrous n-butylbromide in 75 cc. of ether. The stirred mixture was refluxed for an additional two hours and then cooled to −40° C. and treated with 17.7 grams of α-bromopyridine in 50 cc. of ether at such a rate that the temperature was maintained at below −35° C. The reaction mixture was then stirred 25 minutes longer at −64° C. The temperature was then allowed to rise to −45° C. and the stirred reaction mixture treated within 15 minutes with 16 grams of 2-ethyl-9-keto-2,3,4,4a,9,9a-hexahydro-1-pyridindene in 200 cc. of ether. The mixture was stirred for 30 minutes longer at −45° C. The cooling bath was then removed and the mixture stirred 2 hours longer. At the end of this period, the reaction mixture was treated below 10° C. with 157 cc. of 1.02 N hydrochloric acid. The ether and aqueous layers which formed were separated. The aqueous layer was saturated with potassium carbonate and extracted with ether. The ethereal fractions were combined and the ether evaporated. The residue was then distilled, yielding 2-ethyl-9-hydroxy-9(α - pyridyl)-2,3,4,4a,9,9a-hexahydro-1-pyridindene, B. P. 185–190° C. at 0.20 mm. A solution of the base in ether was converted into the picrate by treatment with a saturated solution of picric acid in ether. The picrate of 2-ethyl-9-hydroxy-9-(α - pyridyl)-2,3,4,4a,9,9a-hexahydro-1-pyridindene, after crystallization from nitroethane, melted at 183–190° C.

EXAMPLE 16

*2-ethyl-9-(p-tolyl)-tetrahydro-1-pyridindene oxalate*

A solution of 0.074 mol of p-tolyl lithium in 230 cc. of anhydrous ether, obtained in the known manner from lithium and 4-bromotoluene, was maintained at 0–3° C. with external cooling and treated dropwise while stirring within 30 minutes with 16.6 grams of 2-ethyl-9-keto - 2,3,4,4a,9,9a - hexahydro-1-pyridindene in 200 cc. of ether. After the addition was completed, the cooling was discontinued and the stirring continued for two hours. The reaction temperature was then lowered below 10° C. and while maintaining this temperature the stirred reaction mixture was treated with 77 cc. of 0.1 N hydrochloric acid. Two clear layers resulted. The aqueous layer was then separated and treated with 50 cc. of 50% potassium carbonate solution and extracted three times with 100 cc. portions of ether. The combined ether extracts were dried with sodium sulfate. The dried ether solution was then treated with anhydrous hydrogen bromide and the solution allowed to stand for 16 hours at 40° C. The ethereal liquors were decanted from the gummy hydrobromide which formed and the latter was dissolved in water. The aqueous solution was extracted with ether and then made strongly alkaline with aqueous sodium hydroxide. The free base thus liberated was extracted with ether. The ether extract was dried with sodium sulfate and treated with an ether solution of oxalic acid until no further precipitation of 2-ethyl-9-(p-tolyl)-tetrahydro-1-pyridindene oxalate took place. The oxalate was filtered and treated with 50 cc. of hot acetone. It crystallized slowly, yielding a crystalline product melting at 133-156° C. When recrystallized from methanol, the oxalate of 2-ethyl-9-(p-tolyl)-tetrahydro-1-pyridindene melted at 167-169° C.

In this example, the 2-ethyl-9-hydroxy-9-(p-tolyl)-2,3,4,4a,9,9a-hexahydro-1-pyridindene was not isolated, but appeared to lose water spontaneously with the formation of the 2-ethyl-9-(p-tolyl)-tetrahydro-1-pyridindene.

EXAMPLE 17

*2-ethyl-9-(o-methoxyphenyl)-tetrahydro-1-pyridindene*

A solution of 5.0 grams of 2-ethyl-9-hydroxy-9-(o-methoxyphenyl)-2,3,4,4a,9,9a-hexahydro-1-pyridindene hydrobromide in 50 cc. of 90% formic acid was heated on a steam bath for two hours. The resulting solution was then allowed to stand for 16 hours. The solution was then diluted with 50 cc. of water and treated with a 50% potassium carbonate solution to a pH of 9. The resulting mixture was then shaken for 72 hours. The oily precipitate which formed was extracted with ether and the ethereal solution dried with sodium sulfate. The dried ethereal solution was then treated with 200 cc. of a saturated ether solution of picric acid. After standing for 2 hours, the solution started to deposit crystals. The solution was kept at 4° C. for one hour and then filtered. The picrate of 2-ethyl-9-(o-methoxyphenyl)-tetrahydro-1-pyridindene, M. P. 165-169° C., was obtained. When recrystallized from nitroethane, it melts at 168-169° C.

We claim:

1. 2-methyl-9-keto-2,3,4,4a,9,9a-hexahydro-1-pyridindene.

2. 2-methyl-9-hydroxy-9-phenyl-2,3,4,4a,9,9a-hexahydro-1-pyridindene.

3. 2-ethyl-9-hydroxy-9-(o-methoxy-phenyl)-2,3,4,4a,9,9a-hexahydro-1-pyridindene.

4. A process for producing a 2-lower alkyl-9-keto-2,3,4,4a,9,9a-hexahydro-1-pyridindene which comprises cyclizing a 1-lower alkyl-4-phenyl-piperidine-3-carboxyl halide with anhydrous aluminum chloride.

5. A process according to claim 4, where the carboxyl halide is 1-methyl-4-phenyl-piperidine-3-carboxyl chloride.

6. A compound selected from the group consisting of a 2-lower alkyl-9-keto-2,3,4,4a,9,9a-hexahydro-1-pyridindene, a 2-lower alkyl-9-hydroxy-9-phenyl-2,3,4,4a,9,9a-hexahydro-1-pyridindene, a 2-lower alkyl-9-hydroxy-9-tolyl-2,3,4,4a,9,9a-hexahydro-1-pyridindene, a 2-lower alkyl-9-hydroxy-9-(methoxy-phenyl)-2,3,4,4a,9,9a-hexahydro-1-pyridindene, a 2-lower alkyl-9-hydroxy-9-pyridyl-2,3,4,4a,9,9a-hexahydro-1-pyridindene, and their acid addition salts.

7. A 2-lower alkyl-9-keto-2,3,4,4a,9,9a-hexahydro-1-pyridindene.

8. A 2-lower alkyl-9-hydroxy-9-phenyl-2,3,4,4a,9,9a-hexahydro-1-pyridindene.

9. A 2-lower alkyl-9-hydroxy-9-tolyl-2,3,4,4a,9,9a-hexahydro-1-pyridindene.

10. A 2-lower alkyl-9-hydroxy-9-(methoxyphenyl)-2,3,4,4a,9,9a-hexahydro-1-pyridindene.

11. A 2-lower alkyl-9-hydroxy-9-pyridyl-2,3,4,4a,9,9a-hexahydro-1-pyridindene.

12. 2-ethyl-9-hydroxy-9-(α-pyridyl)-2,3,4,4a,9,9a-hexahydro-1-pyridindene.

JOHN THOMAS PLATI.
WILHELM WENNER.

No references cited.